United States Patent
Teichmann

(10) Patent No.: US 7,355,294 B2
(45) Date of Patent: Apr. 8, 2008

(54) METHOD AND SYSTEM FOR WIND TURBINE BLADE MOVEMENT

(75) Inventor: Ralph Teichmann, Albany, NY (US)

(73) Assignee: General Electric Company, Niskayuna, NY (US)

( * ) Notice: Subject to any disclaimer, the term of this patent is extended or adjusted under 35 U.S.C. 154(b) by 136 days.

(21) Appl. No.: 11/419,665

(22) Filed: May 22, 2006

(65) Prior Publication Data

US 2007/0267873 A1 Nov. 22, 2007

(51) Int. Cl.
*F03D 7/04* (2006.01)
(52) U.S. Cl. ................ 290/44; 290/55; 416/27; 416/31
(58) Field of Classification Search ........... 290/43, 290/44, 54, 55; 416/27, 31; 415/17
See application file for complete search history.

(56) References Cited

U.S. PATENT DOCUMENTS

| | | | | |
|---|---|---|---|---|
| 4,193,005 A * | 3/1980 | Kos et al. | ........... | 290/44 |
| 4,316,698 A * | 2/1982 | Bertoia | ........... | 416/11 |
| 4,423,333 A * | 12/1983 | Rossman | ........... | 290/44 |
| 4,435,646 A * | 3/1984 | Coleman et al. | ........... | 290/44 |
| 4,474,531 A * | 10/1984 | Weiss | ........... | 416/11 |
| 4,584,486 A * | 4/1986 | Quynn | ........... | 290/44 |
| 4,792,281 A * | 12/1988 | Coleman | ........... | 416/156 |
| 5,083,039 A | 1/1992 | Richardson et al. | | |
| 5,155,375 A * | 10/1992 | Holley | ........... | 290/44 |
| 5,365,424 A | 11/1994 | Deam et al. | | |
| 5,369,353 A | 11/1994 | Erdman | | |
| 5,526,252 A | 6/1996 | Erdman | | |
| 5,579,217 A | 11/1996 | Deam et al. | | |
| 5,584,655 A * | 12/1996 | Deering | ........... | 416/31 |
| 5,585,708 A | 12/1996 | Richardson et al. | | |
| 5,907,192 A | 5/1999 | Lyons et al. | | |
| 6,441,507 B1 * | 8/2002 | Deering et al. | ........... | 290/44 |
| 6,652,221 B1 * | 11/2003 | Praenkel | ........... | 415/3.1 |
| 6,853,094 B2 * | 2/2005 | Feddersen et al. | ........... | 290/44 |
| 7,172,392 B2 * | 2/2007 | Wastling et al. | ........... | 416/43 |
| 2004/0100229 A1 | 5/2004 | Wobben | | |

FOREIGN PATENT DOCUMENTS

DE 19720225 A1 7/2006

* cited by examiner

*Primary Examiner*—Nicholas Ponomarenko
(74) *Attorney, Agent, or Firm*—Ann M. Agosti; Patrick K. Patnode

(57) ABSTRACT

This document discusses, among other things, a wind turbine blade pitch system for moving the blades to control their pitch in the event of a power failure. The system includes at least one backup that has a non-electrical component that can pitch the blades in the event that the power failure adversely affects the electrical blade pitch actuator system. Embodiments include pitch systems that have a plurality of pitch driving systems including, but not limited to electrical systems, hybrid electrical/mechanical systems and non-electrical systems. The non-electrical systems include mechanical, pneumatic or hydraulic systems.

23 Claims, 4 Drawing Sheets

METHOD AND SYSTEM FOR WIND TURBINE BLADE MOVEMENT

TECHNICAL FIELD

This patent document pertains generally to the field of wind turbines for power generation, and more particularly, but not by way of limitation, to methods and systems for moving wind turbine blades in response to a loss of electrical power and to methods and systems for moving wind turbine blades using a plurality of power sources.

BACKGROUND

The use of wind turbines as renewable energy sources continues to grow. There is a need to improve the safety features to protect the wind turbine during power outages or other events that may damage the wind turbine, for example, electrical device failure in the wind turbine or lighting strikes. Some wind turbine blades have adjustable pitch to maximize the effect of the wind on the blades. In the event of a power outage, it is desirable to change the pitch of the blades for safety of the wind turbine. Moreover, many wind turbines are remotely located away from maintenance providers so the wind turbine must safely take itself off line until maintenance providers can arrive. Accordingly there is a need for improved wind turbines.

BRIEF DESCRIPTION OF INVENTION

This brief description is intended to provide an overview of the subject matter of the present patent application. It is not intended to provide an exclusive or exhaustive explanation of the invention. The detailed description is included to provide further information about the subject matter of the present patent application.

An embodiment of the present invention is a wind turbine having a hub including a blade pitch control that is operable by an electrical power system and a non-electrical power system. Each blade of a wind turbine is connected to at least one blade pitch control.

The non-electrical power system for pitch control includes a mechanical power source in an embodiment. The non-electrical system can further include pneumatic power or hydraulic power. The mechanical power source includes a spring system connected to the blade. In an embodiment, the spring system includes a torsion spring. The spring system can include a mechanism to bias a spring under a normal operating state and to release the biased spring in an electrical power failure event. The spring system can further include a spring and a gear system connected between the spring and the blade, and wherein the gear system is to limit the power output from the spring on the blade.

Embodiments of the present invention further include sub-systems and methods as described in the present document.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
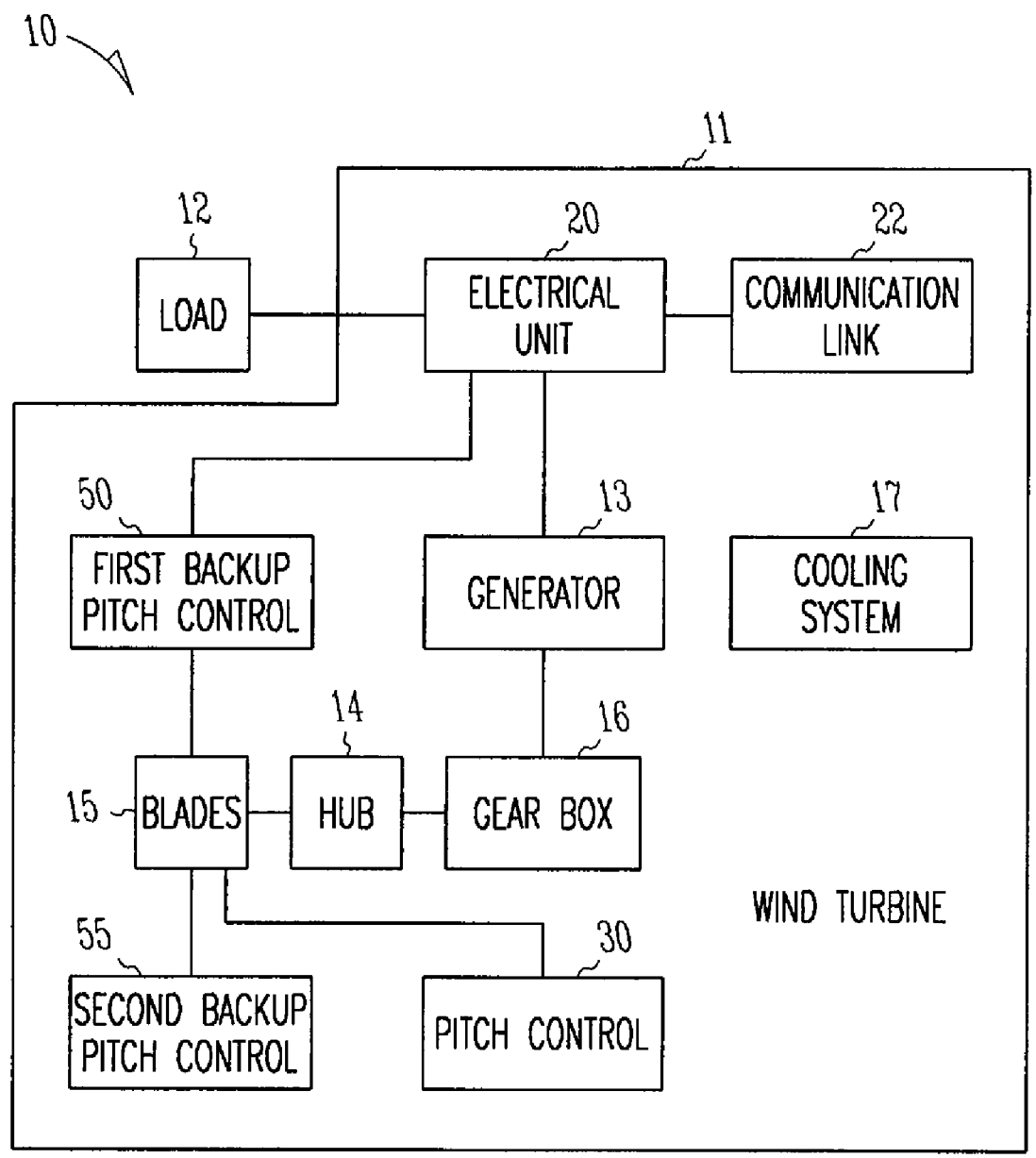
FIG. 1 shows one embodiment of a wind turbine system having an emergency shut down system according to an embodiment of the present invention.

FIG. 1 shows a wind turbine system 10 that includes a wind turbine 11 for generating electrical power supplied to a load 12. The load 12 may include a distribution system such as a power grid or utility grid. The load 12 may further be a localized electrical power consumer such as a manufacturing facility or local distributed electrical power consumer. The wind turbine 11 includes, but is not limited to a tower supporting a nacelle above the ground, not shown. A generator 13 of electrical energy may be positioned in the nacelle. The generator 13 is an asynchronous generator or a synchronous generator in embodiments. A cooling system 17 cools the generator 13 as its operation produces significant heat. The cooling system 17 is air or liquid cooling, or a combination of both. A gear box 16 mechanically connects the generator 13 to a hub 14 from which the blades 15 extend radially outwardly. In an embodiment, the blades have a longitudinal length of about 50 to about 80 feet, other lengths are within the scope of the invention. In an embodiment, the hub 14 is connected to a low speed shaft of the gear box 16. Low speed shaft connects to gears. In an embodiment, the shaft contains pipes for hydraulics to operate aerodynamic brakes and/or blade pitch actuators. In an embodiment, the shaft contains conduit for electrical wiring to electrical devices, such as actuators, sensors, etc. A high speed shaft connects the gearbox to the generator. The gearbox converts energy from the hub and low speed shaft to the high speed shaft for use by the generator 13.

The wind turbine 11 further includes an electrical unit 20 that connects the generator 13 to the load 12. The electrical unit 20 includes computing devices, either programmed general purpose computers or dedicated electronics, to monitor electrical signals and mechanical positions to and from the wind turbine and the load. Electrical unit 20 is a wind turbine controller that has a number of computers to continuously monitor the condition of the wind turbine and collect statistics on its operation. The electrical unit 20 also controls a large number of switches, hydraulic pumps, valves, and motors within the wind turbine. Various parts of the electrical unit may be positioned apart from each other and connect using fiber optics or other high speed communication. The electrical unit 20 may include a controller both at the bottom of the tower and in the nacelle. A further part of the electrical unit 20 may be positioned in the hub with communications through a slip ring. The electrical unit 20 further includes power conditioning circuits to match the wind turbine electrical signal to the load. The electrical unit 20 may be positioned at the ground adjacent or in the tower. The electrical unit 20 communicates with remote devices through a communication link 22. The communication link 22 is a wireline or wireless communication device, such as cellular (mobile) telephone link or an Internet Protocol link. The electrical unit 20 can request service or send alarms over the communication link. The electrical unit 20 may further receive request for information from a remote source, such as a status request or a request collected statistics, and check its present status. A yaw mechanism 40 may be provided.

A pitch control 30 is connected to the blades 15 and operates to change the pitch of the blades to maximize the effect of the wind on the blades to improve efficiency. Tuning the pitch of the blades relative to wind direction provides control of the force on the blade to maximize the force provided by the wind. The pitch of the blades is their rotational position along the longitudinal axis of the blade. The electrical unit 20, in an embodiment, checks the electrical power output of the wind turbine 11 several times per second. When the electrical power output becomes too high, the electrical unit 20 instructs the pitch control 30 to pitch or turn the blades 15 slightly out of the wind. If the electrical power is to low and the blades 15 are not ideally positioned in the wind, then the electrical unit 20 instructs the pitch control 30 to pitch or rotate the blades 15 into the wind. In operation, the pitch control 30 rotates the blades 15 a fraction of a degree at a time while the blades rotate about the nacelle to drive the generator 13. Moreover, the electrical unit generally pitches the blades a few degrees every time the wind changes in order to keep the blades 15 at the optimum angle in order to maximize output for all wind speeds. Pitch control 30 includes, in an embodiment, hydraulics to force the blades to rotate. Pitch control 30 includes, in a embodiment, electrical an actuator connected to each blade to control their pitch.

In case of a malfunction relating to the wind turbine, for example, loss of the power grid, overheating of the gearbox or the generator, etc., the electronic unit 20 automatically stops the wind turbine. The unit 20 further contacts the turbine operator via communication link 22. In this instance, the blades 15 should be feathered into the wind to keep reduce the force on the blades 15 with the blades and hub, i.e., the rotor, not turning. Ideally, the pitch control 30 is powered by the electrical grid, i.e., the load 12, to position the blades. However, when the wind turbine 11 is not connected to the grid or the power on the grid is down, the wind turbine must provide a self contained backup system to control the pitch of the blades 15 thereby reducing the possibility of damage to the turbine.

The wind turbine 11 includes a first backup pitch control 50 and a second backup pitch control 55. The first backup pitch control 50 is an electrical system that receives power from an electrical storage device such as a capacitor or a battery. The electric storage device can be charged using the generator 13. This can occur during regenerative braking of the rotor. The power from the storage is provided through a dc/ac converter and supplied to an electrical motor that acts as an actuator to rotate the blades 15 to control their pitch. The second backup pitch control 55 is a system that can operate in the absence of electrical power in an embodiment. Second backup pitch control 55 includes a mechanical energy storage. Examples of storage include springs and pressurized fluids. In the event of a power failure, for example, a power failure caused by a power spike from the load 12, the first backup pitch control 50 may be damaged. The second backup pitch control 55 can still control the pitch of the blades 15 to feather the blades in the wind and place the blades in a safe position to minimize the possibility of damage to the wind turbine until the power is restored or the wind turbine repaired. After power is restored, the electrical control unit 20 resets the wind turbine to begin generating power. In some instances, the second backup pitch control 55 operates until service personnel can arrive at the wind turbine.

In a further embodiment, the second backup pitch control 55 is a hybrid device that stored mechanical energy and coverts it to electrical energy to drive the pitch actuators. For example, the mechanical energy can be stored in a spring. The spring is a torsion spring that drives a generator to produce electricity that in turn drives the pitch actuators. Other types of mechanical energy can be used such a pressurized fluids, either hydraulic or pneumatic.

Figure 2:
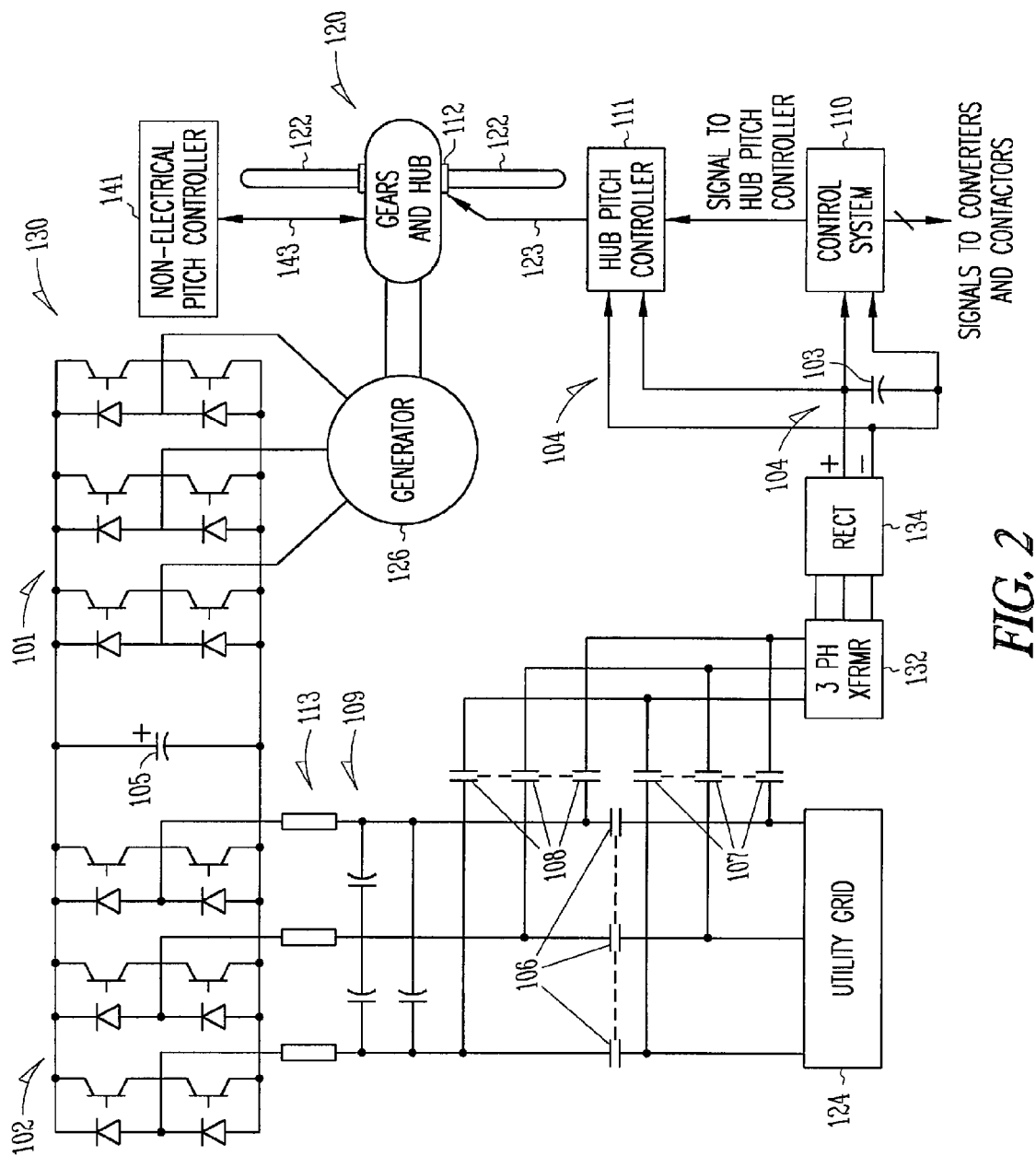
FIG. 2 shows one embodiment of a wind turbine system having an emergency shut down system according to an embodiment of the present invention.

FIG. 2 shows an embodiment of the present invention that uses stored rotational energy in an operating variable speed wind turbine 120 to pitch wind turbine blades 122. Pitching the blades 122 brakes the turbine in the event of a failure of a utility grid 124 (which in one embodiment is a three phase 50/60 hertz grid). An emergency pitch control system 130 provides a backup pitch control when the main power to the pitch controller is disrupted and the wind turbine must be shut down. The system 130 uses a first converter 101 and a main power converter 102 to supply control and pitch servo power, for example, during turbine deceleration and shut down. A ride-through capacitor 103 on a DC emergency power bus 104 (which in an embodiment is a 325 volt bus) and a main DC link capacitor 105 provide additional energy storage that may be used to operate an electrical backup pitch control. A three phase transformer 132 and a rectifier 134 can be used to convert the three phase signals from the utility grid and the grid converter to a single phase signal for a control system 110.

In the event of utility grid power loss, the control system 110 senses either undervoltage or out of frequency conditions in the grid converter 102. Control system 110 isolates the grid converter 102 from the utility grid by sending a signal to drop main power contacts 106. Control system 110 reroutes auxiliary power feed off of the utility grid by sending a signal to drop a first set of auxiliary power contacts 107. The controller 110 sends a signal to energize a second set of auxiliary contacts 108 to thereby feed the emergency power supply bus 104 from the filtered output of the grid converter 102. The switch-over transient is estimated to last about 5 cycles. Sufficient stored charge from ride-through capacitor 103 can be provided to prevent faulty operation of the control system 110 during the switch-over transient.

Control system 110 then switches operational modes of the generator converter 101 gating and regulates the DC bus voltage while extracting energy from the rotating inertia of the wind turbine hub and blades, i.e., regeneratively braking the wind turbine. The control system 110 also switches modes for the grid converter 102 gating regulating the voltage across filter inductors 113 and filter capacitors 109. The control system 110 can command the hub pitch controller 111 to initiate a rapid pitch of the electric pitch actuator 112 requiring peak servo power. Wire harness 123 includes control and power cables for feeding electricity to the pitch servo drive motors. The power flow required by the pitch actuator 112 is a small fraction of that available from the main generator 126. Power flow can be maintained in balance with that required by the pitch drive motors by regulating the DC bus voltage with the generator converter 101. The torque control loop thus becomes a minor loop of a DC bus voltage regulator.

The control system 110 signals the generator converter 101 to continue electromagnetic braking, thereby recharging the DC link capacitor 105 or a battery until the turbine rotor slows to idle speed with the blades fully pitched and the pitch servo motor brakes set. At this point the control system 110 will disable gating of the generator converter 101, leaving the DC link capacitor 105 with a substantial stored charge. The remaining charge in the large DC link capacitor 105 will be sufficient to ride through most utility grid outages, or if the utility grid is not restored, will provide time for an orderly shut-down of the turbine.

A second pitch, backup controller 141 is connected to the blades 122 at the hub. The second pitch controller 141 is non-electrical in an embodiment. Such a non-electrical pitch controller 141 relies on stored mechanical energy to pitch the blades during a power interruption in an embodiment. Thus, the pitch of the blades can be changed in the event that the main power, for example, from the load or grid, is disrupted at the same time the backup electrical system for parking the blades is off-line. Example of situations when such an event could occur are lighting strikes or other large electromagnetic pulses. Accordingly, a purely mechanical pitch controller 141 would still operate to feather the blades into the wind. This will allow the wind turbine to safely be stored until maintenance can arrive.

In an embodiment, the second pitch controller 141 further relies on stored mechanical energy to generate electricity to drive the motors to pitch the blades. This system will be separate from the other electrical systems of the wind turbine. In an embodiment, the stored mechanical energy is converted to electrical energy to run the electrical actuators to change the blade pitch as needed. In this embodiment, the pitch controller 141 has a plurality of different back up power sources of different types to move the blades and change their pitch. In one example, a spring can drive a generator that in turn powers the pitch motors to turn the blades. Using the stored mechanical energy to directly pitch the blades can only be done in one direction. Using the stored mechanical energy to generate electricity allows the stored energy to pitch the blades in two directions by providing circuitry to provide appropriate signals to move the drive motors in either direction.

Figure 3:
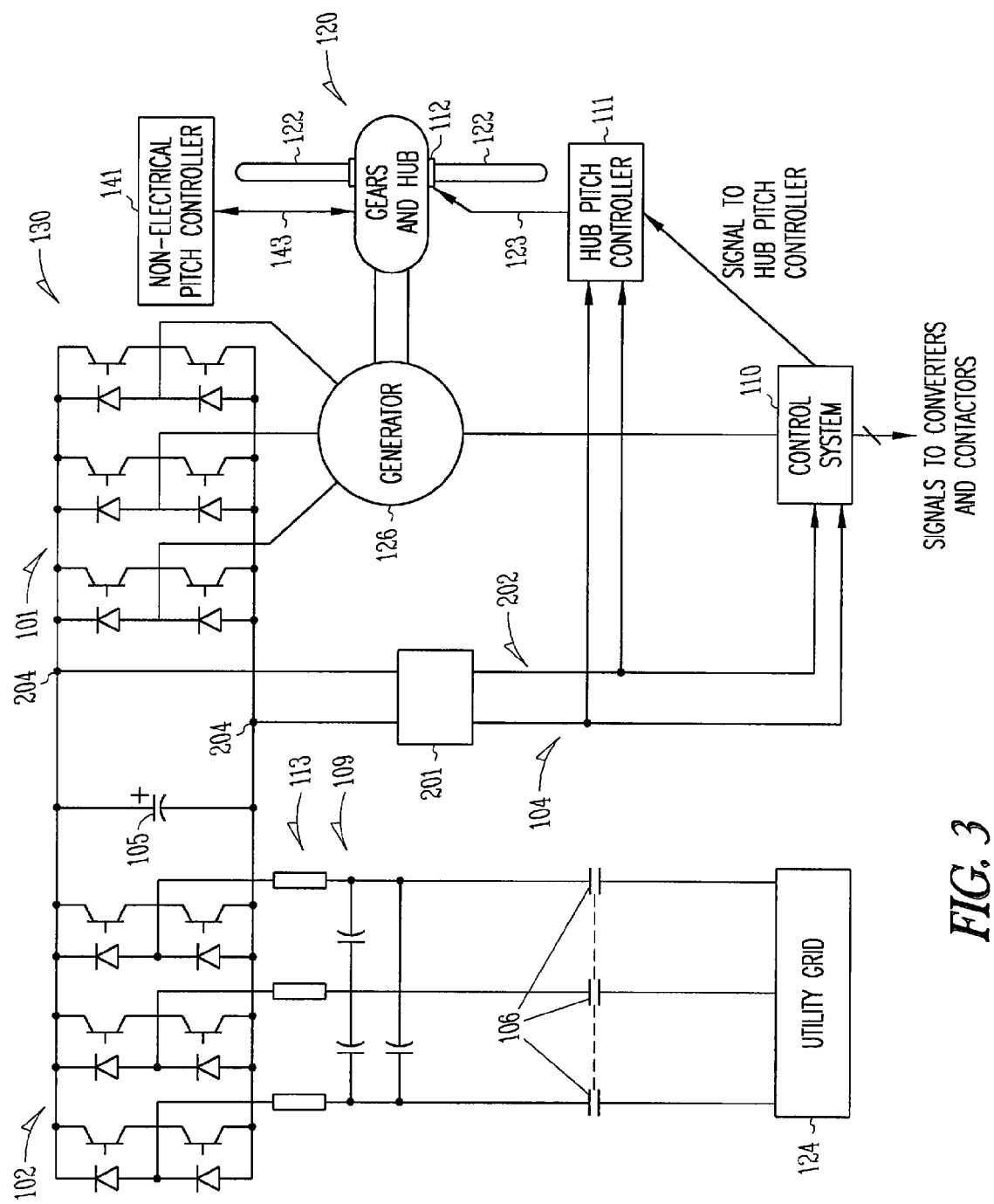
FIG. 3 shows one embodiment of a wind turbine system having an emergency shut down system according to an embodiment of the present invention.

FIG. 3 shows an embodiment that similarly uses the stored rotational energy in an operating variable speed wind turbine 120 to pitch blades 122 and hence brake the turbine. A step-down DC/DC power converter 201 is added to the intermediate DC link 204 of the power conversion system. The secondary 202 of the step down converter is used to power both the hub pitch controller 111 and the control system 110.

In the event of utility grid power loss, control system 110 will sense either undervoltage or out of frequency condition of the grid converter 102 and then turn off the grid converter gating signals and drop main contacts 106. The control system 110 will cause the generator converter 101 to switch operational modes and regulate the DC bus voltage while extracting energy from the rotating inertia to regeneratively brake the wind turbine. In this manner, the DC link capacitor 105 will recharge, with the grid converter 102 isolating the DC link from the collapsing utility grid. As in the embodiment of FIG. 2, the control system 110 will command the hub pitch controller 111 to initiate a rapid pitch of the electric pitch actuator 112, requiring peak servo power of approximately 10 kW in a 500 kW wind turbine system. The power required by the pitch servo drive motors is, again, a small fraction of that available from the main generator.

The control system will cause the generator converter 101 to continue electromagnetic braking, thereby recharging the DC link capacitor 105 until the turbine rotor slows to idle speed with the blades fully pitched and the pitch servo motor brakes set. Then the control system will disable gating of the generator converter 101, leaving the DC link capacitor 105 with a substantial stored charge. The remaining charge in the large DC link capacitor 105 will be sufficient to keep the control system powered for several minutes, providing sufficient time to ride through most utility grid outages, or if the utility grid is not restored, time for an orderly shut-down of the turbine.

In the event of a loss of power through generator converter 101 or from DC link capacitor 105, or damage of hub pitch controller, for example, by a lightning strike or power surge from the utility grid 124, the pitch controller 141 can park the blades into a pitch that is safe for the wind turbine.

Figure 4:
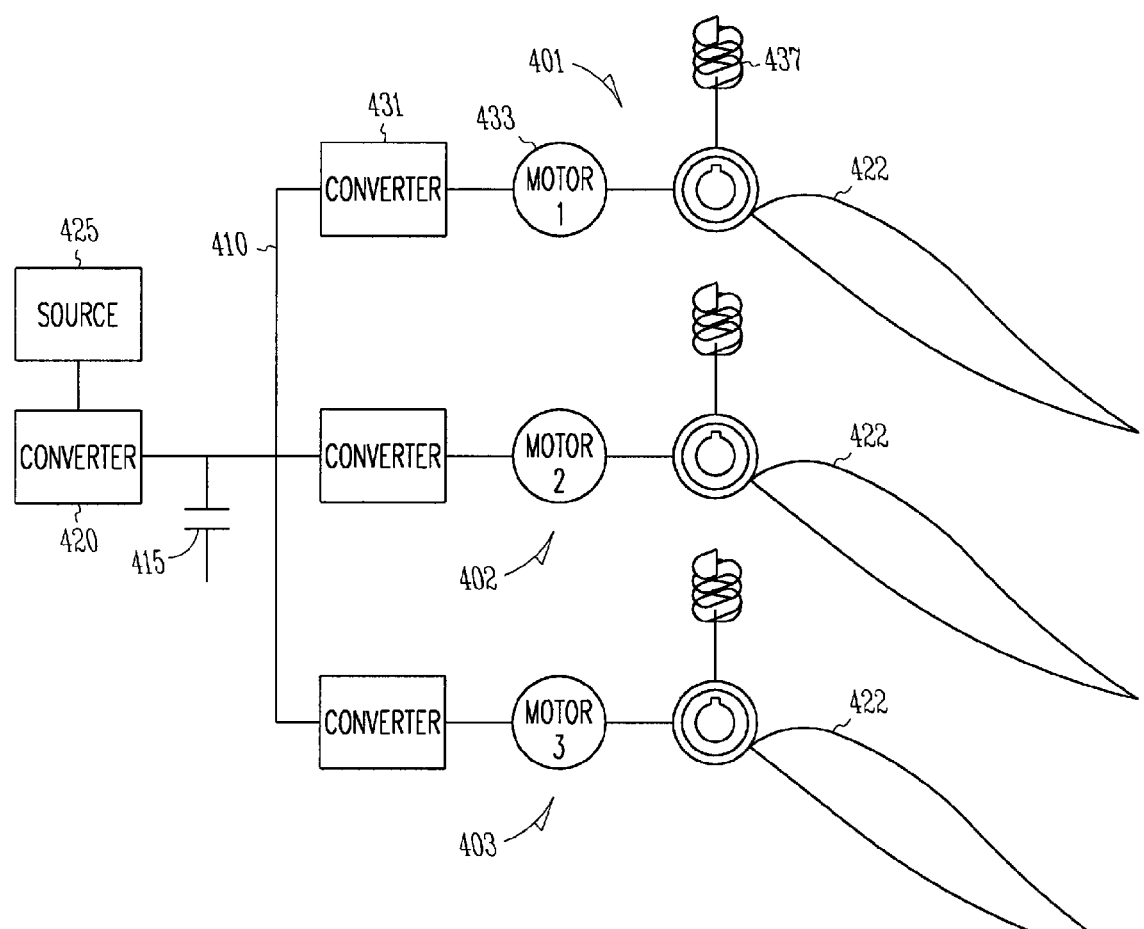
FIG. 4 shows one embodiment of a wind turbine system having an emergency shut down system according to an embodiment of the present invention

FIG. 4 shows a system 400 that includes three assemblies 401, 402 and 403 that each provides two sources of pitch control backup. Each of these assemblies is connected to a wind turbine blade 422. Each backup assembly 401, 402, 403 is connected to the common DC bus 410. The DC bus 410 is connected to a central storage capacitor 415, which in some embodiments is the same as capacitor 105 described herein. A converter 420 connects the DC bus to a source 425. The source 425, in some embodiments, is the utility grid or the power converters (e.g., 101 or 102) described above. As the assemblies 401, 402, 403 are the same only assembly 401 will be described in detail for ease of illustration with the understanding that same features are applicable to each assembly. A converter 431 connects the DC bus 410 to a motor 433. The motor 433 turns a gear system 435 that is attached to the base of the wind turbine blade 422. The gear system 435 is positioned at the hub of the wind turbine. The motor 433 is controlled, for example, by a controller in electrical unit 20, to position the blade 422 at a desired pitch.

A mechanical power source 437, illustrated as a spring in FIG. 4, is connected to the gear system 435. The mechanical power source can thusly provide motive force to the gear system to change the pitch of the blade 422. The mechanical source 437 can also drive the motor 433 through gear system 435 to generate electrical power that could be stored in a battery or capacitor 415. While illustrated as a spring, the mechanical power source 437 can be other non-electrical power sources such as pressurized fluids to drive the gear system or generate electrical power. The mechanical power source 437 is held in a state that stores electrical energy when the wind turbine is operating under normal conditions. The mechanical source 437 may have an electrical actuator that holds the mechanical source in an energy storage position until the power is interrupted, then the actuator is deactivated to release the energy stored in the source 437. The assembly 401 thus provides at least two sources of backup blade pitch control with different forms of power. One of these power sources is non-electrical so that the blades can be positioned in a safe, park position in the event of a power failure any where within the electrical system, i.e., from the load, utility grid, converters, electrical energy storage devices, buses, or motors.

In normal, uninterrupted operation the source 425 powers the motor through the converter 420, DC bus 410 and converter 431. The motor can be a stepper motor, dc motor or ac motor controlled by the converter 431. When the AC source 425 experiences a power failure or is otherwise disconnected from the wind turbine without adequate time to safely shut down and park the blades in their safe pitch position, the electrical energy storage device, e.g., capacitor 415 or a battery, provides power to the motor 433 to safely pitch the blades. In other types of emergency situations, the electrical power is not available to the motor or the motor control is off line, then the pitch control assembly has a further non-electrical backup pitch control. The mechanical power source 437 is enacted to drive the gear system 435 to move the blades into a safe, pitch position, which can be referred to as a zero position or park position. The mechanical power source 437 typical only has one direction of movement. Accordingly, it is biased to move the blade into the park position.

It will be recognized that the present hybrid mechanical/electrical power system is extendable to providing power to other emergency critical devices and systems in the wind turbine. For example, after pitching the blades, excess power can be routed to the electrical unit or control system to power communication to a remote location or ensure a safe backup or the operating parameters at the time of the event.

The present disclosure describes systems, devices and methods to provide a plurality of emergency power sources to move wind turbine blades to a parked, feather position in the event of a loss of main power. The emergency sources of power include, but are not limited to, a back up electrical source connected to the main systems, a separate electrical source distinct from the main systems, a mechanical source, and a hybrid source that combines mechanical and electrical sources. A wind turbine that has multiple pitch control systems and differing systems to power these pitch control systems increase reliability. Moreover, environmental factors that may impair one system may not affect another system. That is the risk of a complete inability to park the blades in a correct pitch is reduced to almost zero even in the event of a complete electrical power loss. This may prevent structural damage.

It will be necessary to provide sufficient power to correctly pitch the blades. However, the amount of stored power necessary to park the blades depends on many factors. These factors include the size of the blades and the force required to overcome any device that provides a load to pitching the blades. Other factors may include the need to change the pitch of the blades more than once, for example, if the wind turbine is in a remote location where maintenance personnel will not arrive for some time and the failure type experienced by the wind turbine. The present disclosure describes systems, devices and methods that protect a wind turbine in the case of a potentially catastrophic event. Moreover, the availability of the wind turbine is increased as it can protect itself during such an event. Availability and reliability are very important in megawatt wind turbines as they are significant contributors to an electrical power grid.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A wind turbine, comprising:
   a hub including a blade pitch control;
   a blade connected to the blade pitch control; and
   wherein the blade pitch control is operatable by an electrical power system and a non-electrical system.

2. The wind turbine of claim 1, wherein the blade pitch control includes a backup electrical power source that is activated with a disruption in a utility power grid.

3. The wind turbine of claim 2, wherein the backup electrical power source includes a capacitor connected to power converters of the wind turbine.

4. The wind turbine of claim 3, wherein the non-electrical system includes a mechanical power source.

5. The wind turbine of claim 4, wherein the mechanical power source includes a spring system connected to the blade.

6. The wind turbine of claim 4, wherein the spring system includes a torsion spring.

7. The wind turbine of claim 4, wherein the spring system includes a mechanism to bias a spring under a normal operating state and to release the biased spring in an electrical power failure event.

8. The wind turbine of claim 7, wherein the spring system includes a spring and a gear system connected between the spring and the blade, and wherein the gear system is to limit the power output from the spring on the blade.

9. The wind turbine of claim 1, wherein the non-electrical system includes at least one selected from a group of a hydraulic power source and a pneumatic power source.

10. A wind turbine, comprising:
a hub including a blade pitch control system;
a blade connected to the blade pitch control;
a generator system connected to the hub, the generator system being adapted to produce electricity to a load; and
the blade pitch control system having a main pitch control operable on electrical energy from at least one of the load and the generator system, an electrical, first backup pitch control operable on the loss of power to the main pitch control, and a second backup pitch control operable on the loss of power to the main pitch control and the first backup pitch control.

11. The wind turbine of claim 10, wherein the first backup pitch control includes an electrical blade pitch actuator and an electrical energy storage to power the blade pitch actuator, and wherein the second backup pitch control includes a mechanical power source.

12. The wind turbine of claim 11, wherein the mechanical power source includes a spring system connected to the blade.

13. The wind turbine of claim 12, wherein the spring system includes a torsion spring and a mechanism to bias the spring under a normal operating state and to release the biased spring in an electrical power failure event.

14. The wind turbine of claim 12, wherein the spring system includes a spring and a gear system connected between the spring and the blade, and wherein the gear system is to limit the power output from the spring on the blade.

15. The wind turbine of claim 11, wherein the second backup pitch control includes function in which the power flow in the pitch actuator is reversed such that mechanical power provides electrical power for storage for later use.

16. The wind turbine of claim 15, wherein the pitch actuator produces electricity for storage in the electrical energy storage of the first backup pitch control.

17. A method for providing backup power to a wind turbine, comprising:
sensing an electrical power failure in the wind turbine; and
activating a backup blade pitch system, wherein activating the backup blade pitch system includes using an electrical backup system to control the blade pitch, determining a failure of the electrical backup system, and if the electrical backup system fails, activating a non-electrical backup system to control blade pitch.

18. The method of claim 17, wherein using the electrical backup system includes drawing electrical power from regenerative braking of the blades.

19. The method of claim 18, wherein using the electrical backup system includes charging an electrical energy storage device with the electrical power from regenerative braking, and subsequently powering the pitch control with the stored electrical energy.

20. The method of claim 19, wherein determining a failure of the electrical backup system includes sensing a power level as too low to drive the pitch control, and wherein activating a non-electrical backup system to control blade pitch is based on the sensed low power level.

21. The method of claim 20, wherein activating a non-electrical backup system includes releasing a tensioned spring to mechanically drive the pitch of the blades.

22. The method of claim 21, wherein activating a non-electrical backup system includes governing the motion of the blades with a gear system connected to the spring.

23. The method of claim 17, wherein activating a non-electrical backup system includes activating at least one of a hydraulic power and pneumatic power.

* * * * *